F. McCLUSKEY.
JOINT FOR TUBULAR PILING.
APPLICATION FILED JAN. 18, 1912.

1,025,759.

Patented May 7, 1912.

UNITED STATES PATENT OFFICE.

FRANK McCLUSKEY, OF NEW YORK, N. Y.

JOINT FOR TUBULAR PILING.

1,025,759.   Specification of Letters Patent.   Patented May 7, 1912.

Application filed January 18, 1912. Serial No. 671,804.

*To all whom it may concern:*

Be it known that I, FRANK MCCLUSKEY, a citizen of the United States, residing in the city of New York, in the county of New York and State of New York, have invented certain new and useful Improvements in Joints for Tubular Piling; and I do hereby declare the following to be a full, clear, and exact description of the invention, such as will enable others skilled in the art to which it appertains to make and use the same.

My present invention has relation to a convenient, simple and inexpensive device for securely joining successive sections of pipe in tubular piling, driven wells and the like.

The invention is illustrated in a preferred form in the accompanying drawings, wherein—

Figures 1, 2:
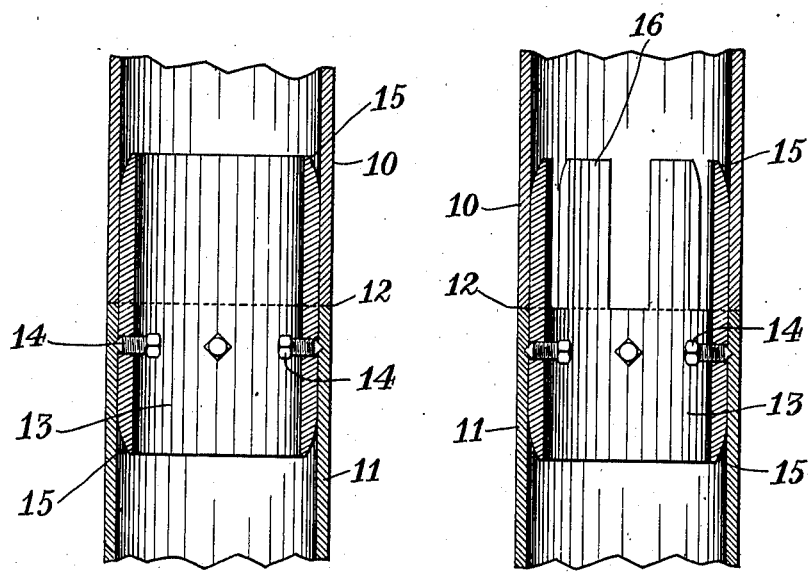
Figure 3:
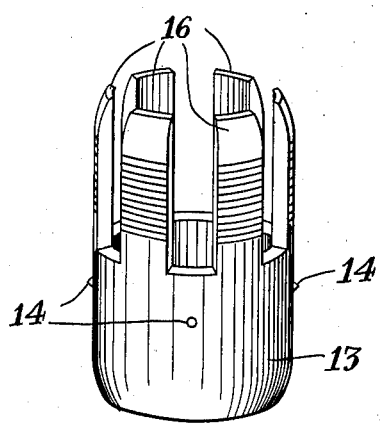

Figure 1 is a vertical section of abutting pipe sections furnished with my improved joint, Fig. 2 is a similar view of a modified form thereof, and Fig. 3 is a perspective view of the joining device.

The abutting pipe sections are shown respectively at 10 and 11, the line of abutment being indicated at 12. The joining device comprises a sleeve 13, furnished with pointed bolts 14, threaded into the sleeve at intervals, and having the points turned outward. Each bolt is provided with a polygonal head inside the sleeve 13, as shown, by means of which, after insertion of the sleeve in one of the pipe sections, the points of the bolts may be forced outward so as to become more or less embedded in the material of the pipe section. The sleeve is thus secured from all possibility of slipping in the pipe. I prefer to taper the ends of the sleeve, as at 15, to facilitate its introduction in the pipe sections.

In Figs. 2 and 3, the sleeve is shown so constructed as to comprise separate extended portions 16, preferably ridged or roughened as shown in Fig. 3. The sleeve is made of malleable iron or other suitable metal of sufficient resilience, so that the spring-like action of the extended portions 16 may serve to cause the sleeve to tightly hug the pipe section, and tend to hold the sections together over the sleeve as a whole.

The number and locations of the bolts are not essentials of the invention, and it is obvious that inversion of the device, whereby the bolts are used within the upper pipe section and the springy extensions within the lower pipe section, would be well within my invention.

Other changes may be made in this device without departing from the spirit and scope of my invention, and I do not limit myself to the improvements herein shown and described.

What I claim is—

1. A tubular piling comprising a series of abutting pipe sections of sufficient thickness and strength to resist driving blows, in combination with joining sleeves, having opposite ends telescoping into abutting pipe sections at the joints, each sleeve being provided at one of its telescoping portions with set-screws turned point outward and engaging the interior surface of the pipe section into which it fits; the whole arranged substantially as described to present a smooth surface without change of diameter at the joints.

2. A tubular piling, comprising a series of abutting pipe sections of sufficient thickness and strength to resist driving blows, in combination with joining sleeves, each of which comprises a portion fitting into one abutting pipe end and provided with set screws, turned outward to engage said pipe end, and another portion divided into resilient sections fitting the opposite abutting pipe end and hugging the interior thereof by virtue of their resilience, the whole arranged substantially as described to present a smooth surface, without change of diameter at the joints.

In testimony whereof, I affix my signature, in presence of two witnesses.

FRANK McCLUSKEY.

Witnesses:
 H. S. MACKAYE,
 KATHARINE C. MEAD.